United States Patent [19]

Trotta et al.

[11] Patent Number: 4,492,763
[45] Date of Patent: Jan. 8, 1985

[54] LOW DISPERSION INFRARED GLASS

[75] Inventors: Patrick A. Trotta, Plano; Paul A. Zak, Dallas, both of Tex.

[73] Assignee: Texas Instruments Incorporated, Dallas, Tex.

[21] Appl. No.: 395,774

[22] Filed: Jul. 6, 1982

[51] Int. Cl.³ ............................ C03C 3/12; C03C 3/30
[52] U.S. Cl. ................................... 501/40; 501/904
[58] Field of Search ................ 501/40, 904; 350/1.4

[56] References Cited

U.S. PATENT DOCUMENTS

| | | | |
|---|---|---|---|
| 3,117,013 | 1/1964 | Northover et al. | 501/40 |
| 3,177,082 | 4/1965 | MacAvoy | 501/904 |
| 3,241,009 | 3/1966 | Dewald et al. | 501/40 |
| 3,312,922 | 4/1967 | Eubank et al. | 501/40 |
| 3,312,923 | 4/1967 | Eubank | 501/40 |
| 3,312,924 | 4/1967 | Eubank et al. | 501/40 |
| 3,317,732 | 5/1967 | Deeg | 501/40 |
| 3,596,136 | 7/1971 | Fischer | 501/40 |

Primary Examiner—Mark Bell
Attorney, Agent, or Firm—Alva H. Bandy; Leo N. Heiting; Melvin Sharp

[57] ABSTRACT

The present invention teaches infrared chalcogenide glass compositions having very low dispersion in the eight to twelve micron range, which are formed as III-V-VI-VII compositions, e.g. 14% (atomic) gallium plus 25% antimony plus 40% selenium plus 21% bromine. The introduction of a group VII component into a chalcogenide glass provides low dispersion, and the group III component compensates for the strong devitrification tendencies of the group VII component and maintains the mechanical properties of the glass.

7 Claims, 18 Drawing Figures

LOW DISPERSION INFRARED GLASS

BACKGROUND OF THE INVENTION

The present invention relates to infrared-transmissive glasses.

In the design of optical systems which are to be operated over broad wavelength bands, it is necessary to have two materials available which possess significantly different optical dispersions. The difference in dispersions can be used as a design parameter to affect the focus position of different wavelengths within the wavelength band, and superior imagery can thus be achieved over systems which are uncorrected for the dispersive properties inherent in all optical materials.

The great majority of infrared optical systems in use today use germanium as a low dispersion optical material. A dispersion difference is achieved by using more highly dispersive materials such as $Ge_{28}Se_{60}Sb_{12}$, $Ge_{33}Se_{55}As_{12}$, zinc sulfide, zinc selenide, or gallium arsenide—to name a few—in conjunction with the germanium. Thus, because of the rapid growth of the infrared industry, and because of the near universal use of germanium in IR optical systems, the utilization of germanium has greatly increased. The resulting demand has caused the price of germanium to escalate rapidly and considerable concern exists regarding its future availability.

Thus it is an object of the present invention to provide a germanium-free low dispersion infrared optical material.

It is a further object of the invention to provide a low-dispersion infrared optical material which does not require materials which are in limited supply.

Chalcogenide glasses, which have been studied extensively for IR transmission, include a wide variety of compounds containing a chalcogenide element (i.e. oxygen, sulfur, selenium, or tellurium). However, oxygen-containing glasses are typically not transmissive at wavelengths of interest. Although some low dispersion chalcogenide glasses are previously known (e.g. arsenic triselenide) the known materials have consistently exhibited undesirable mechanical properties such as low melting point, low modulus of rupture, and low hardness.

Thus it is an object of the present invention to provide a low dispersion chalcogenide glass having good mechanical properties.

It is a further object of the present invention to provide a low dispersion chalcogenide glass having a softening point greater than 250° C.

It is a further object of the present invention to provide a low dispersion chalcogenide glass having good hardness at room temperature.

A further difficulty with prior art compositions is their use of hazardous constituents. In particular, arsenic is violently poisonous and also carcinogenic. The high arsenic vapor pressure over a melt of arsenic—containing mixture poses major safety hazards.

Thus, it is an object of the present invention to provide a low-dispersion chalcogenide glass composition which does not contain carcinogenic or highly poisonous constituents.

It is a further objective of the present invention to provide a low-dispersion chalcogenide glass composition, having good mechanical strength, which does not contain arsenic.

Additional background on wavelength—corrected and infrared optical systems is found e.g., in the OSA *Handbook of Optics* (1978) and the *Infrared Handbook* (1978), both of which are hereby incorporated by reference.

It is a further object of the invention to provide an economical wavelength—corrected optical system.

SUMMARY OF THE INVENTION

The present invention teaches use of III-V-VI-VII compounds to provide a low dispersion infrared transmitting glass. A sample composition taught by the present invention is $Ga_{14}Sb_{25}Se_{40}Br_{21}$.

According to the present invention there is provided: a composition of matter, consisting of: a glass comprising a chalcogenide element, a halogen element, and an element from group IIIa, said chalcogenide being selected from the group consisting of sulfur, selenium, and tellurium, said halogen being selected from the group consisting of chlorine, bromine, and iodine, and said group IIIa element being selected from the group consisting of aluminum, gallium, indium, and thallium.

According to the present invention there is provided: a glass comprising a halogen, a chalcogenide, a pnictide, and an element from group IIIa, said chalcogenide being selected from the group consisting of sulfur, selenium, and tellurium, said halogen being selected from the group consisting of chlorine, bromine, and iodine, said pnictide being selected from the group consisting of phosphorus, arsenic, antimony, and bismuth, and said group IIIa element being selected from the group consisting of aluminum, gallium, indium, and thallium.

According to the present invention there is provided: a glass comprising a chalcogenide, a halogen, and a pnictide, said chalcogenide being selected from the group consisting of sulfur, selenium, and tellurium, said pnictide being selected from the group consisting of phosphorus, arsenic, antimony, and bismuth, and said halogen being selected from the group consisting of chlorine, bromine, and iodine.

According to the present invention there is provided: one or more high-dispersion elements, each said high dispersion element being smooth and consisting essentially of a material which has high dispersion and transmission over said selected range of wavelengths; and one or more low-dispersion elements, each said low-dispersion element being smooth and consisting essentially of a material which has low dispersion, high transmission, and significant refractive index over said selected range of wavelengths; said high-dispersion and low-dispersion elements being arranged in optical series, whereby at least two widely separated wavelengths within said selected range are imaged in coincidence; wherein at least one of said low-dispersion elements comprises a glass comprising a chalcogenide element, a halogen element, and an element from group IIIa, said chalocogenide being selected from the group consisting of sulfur, selenium, and tellurium, said halogen being selected from the group consisting of chlorine, bromine, and iodine, and said group IIIa element being selected from the group consisting of aluminum, gallium, indium, and thallium.

BRIEF DESCRIPTION OF THE DRAWINGS

The present invention will be described with reference to the accompanying drawings, wherein:

FIG. 18 shows an economical wavelength—corrected germanium free infrared optical system.

DESCRIPTION OF THE PREFERRED EMBODIMENTS

Figure 9:
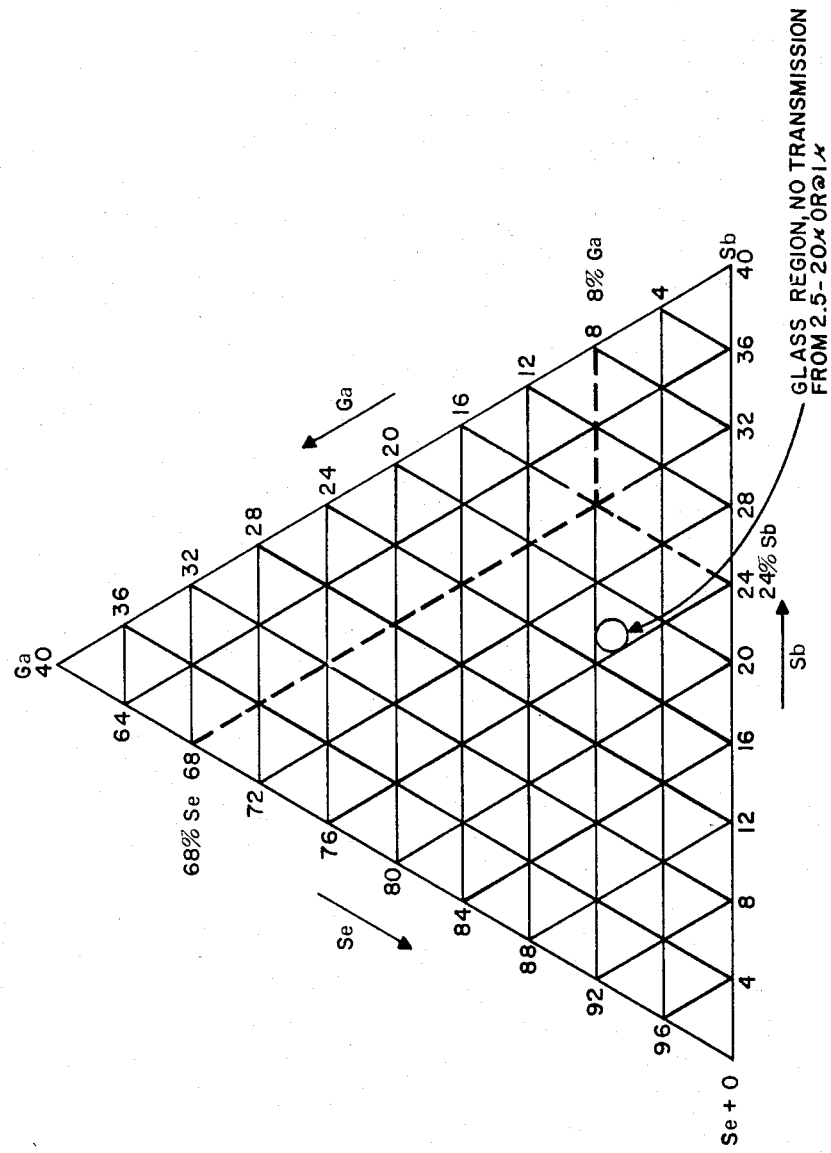
Figure 10:
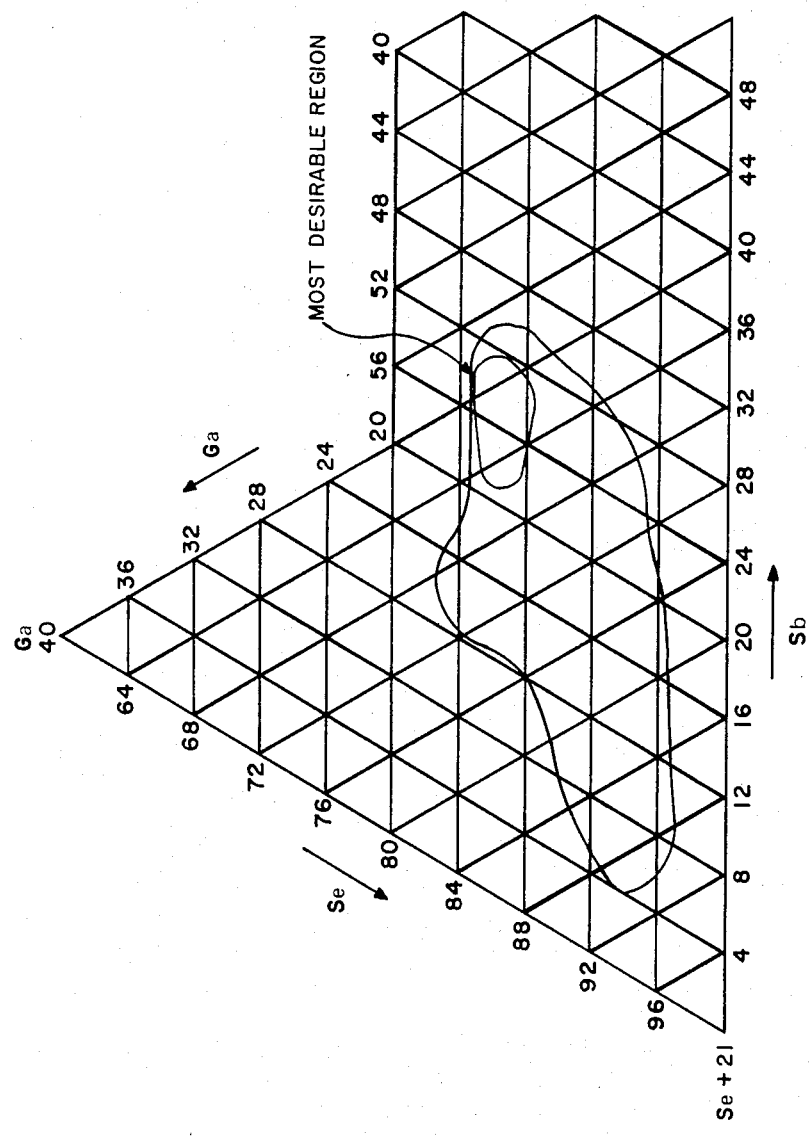
FIGS. 10-17 show quaternary glass compositions including gallium, antimony, selenium, and bromine, including a range of compositions useful in practicing the present invention.
Figure 11:
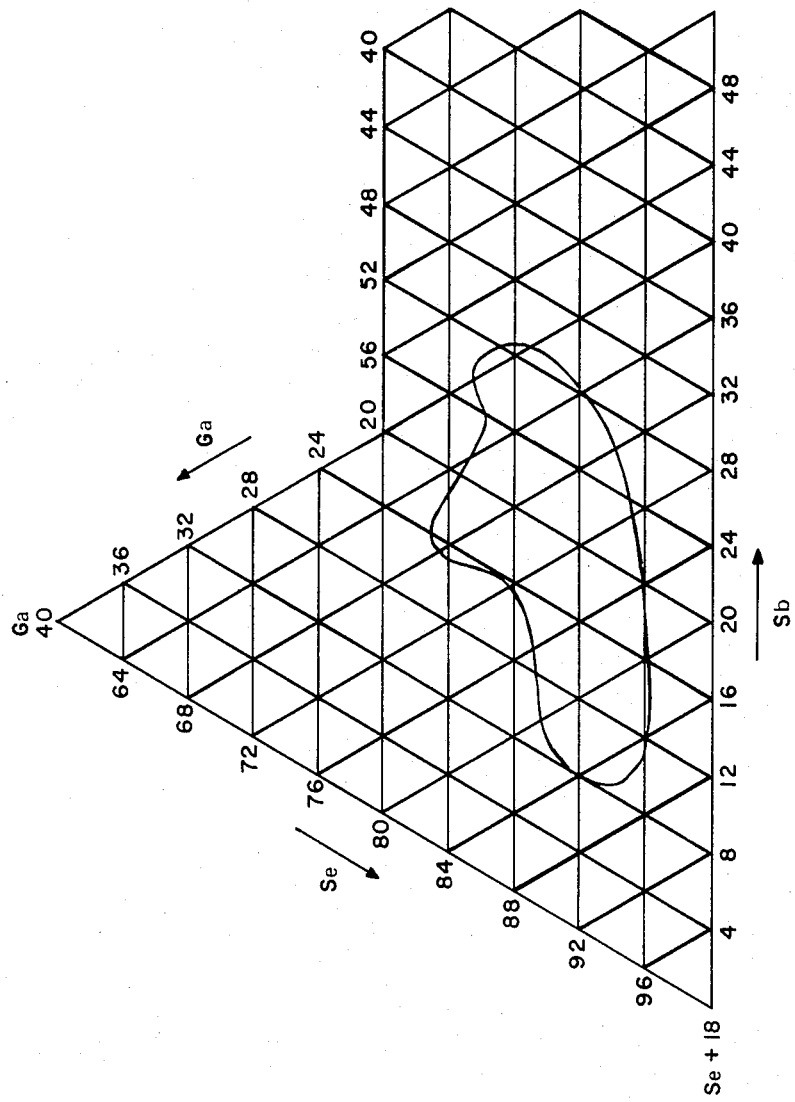
Figure 12:
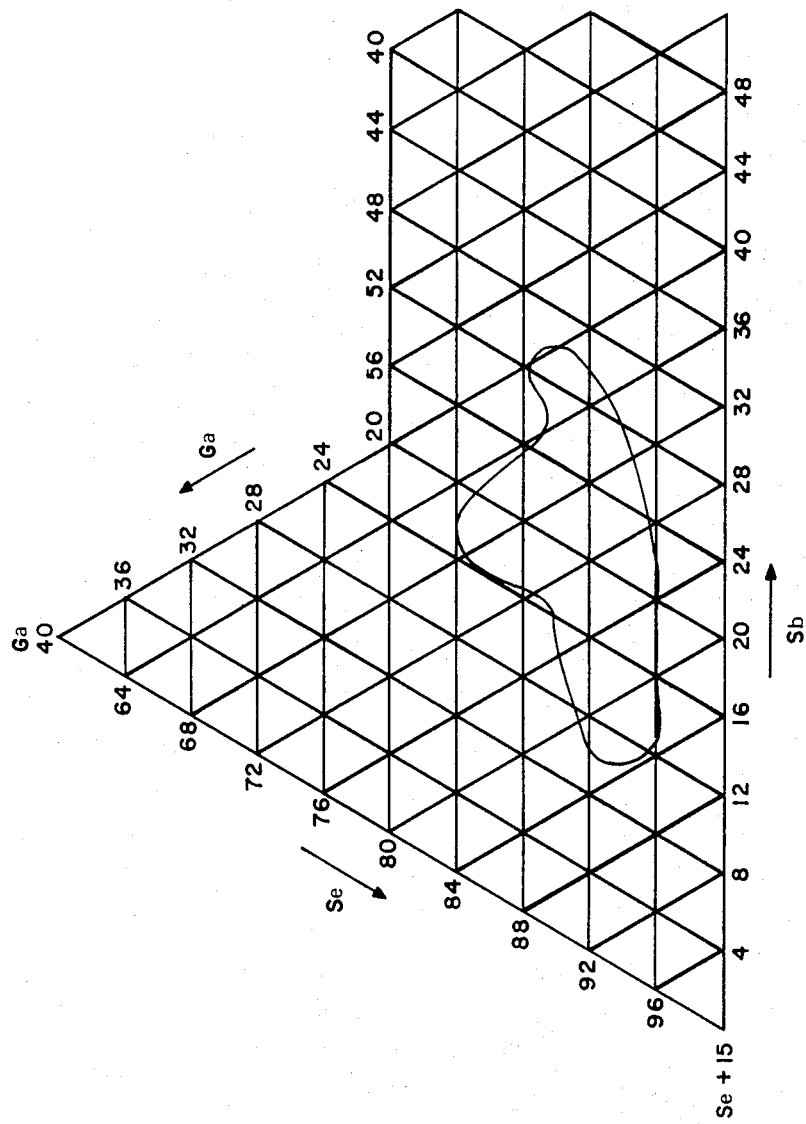
Figure 13:
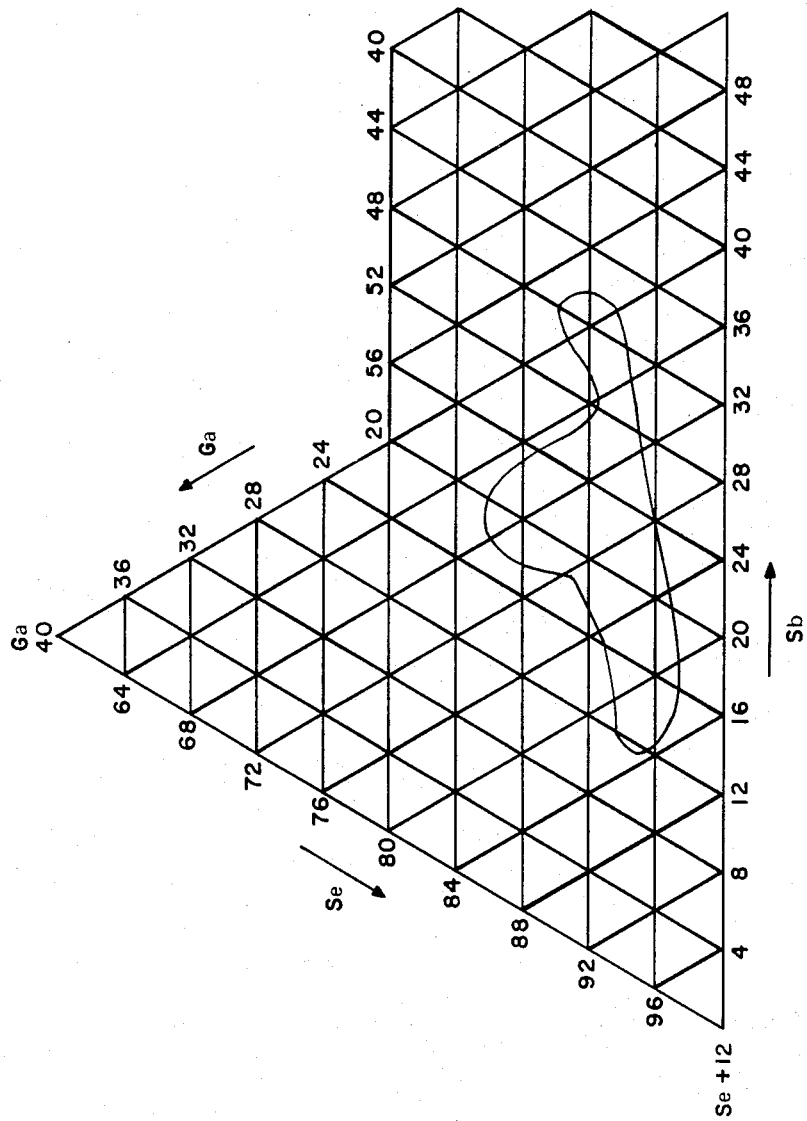
Figure 14:
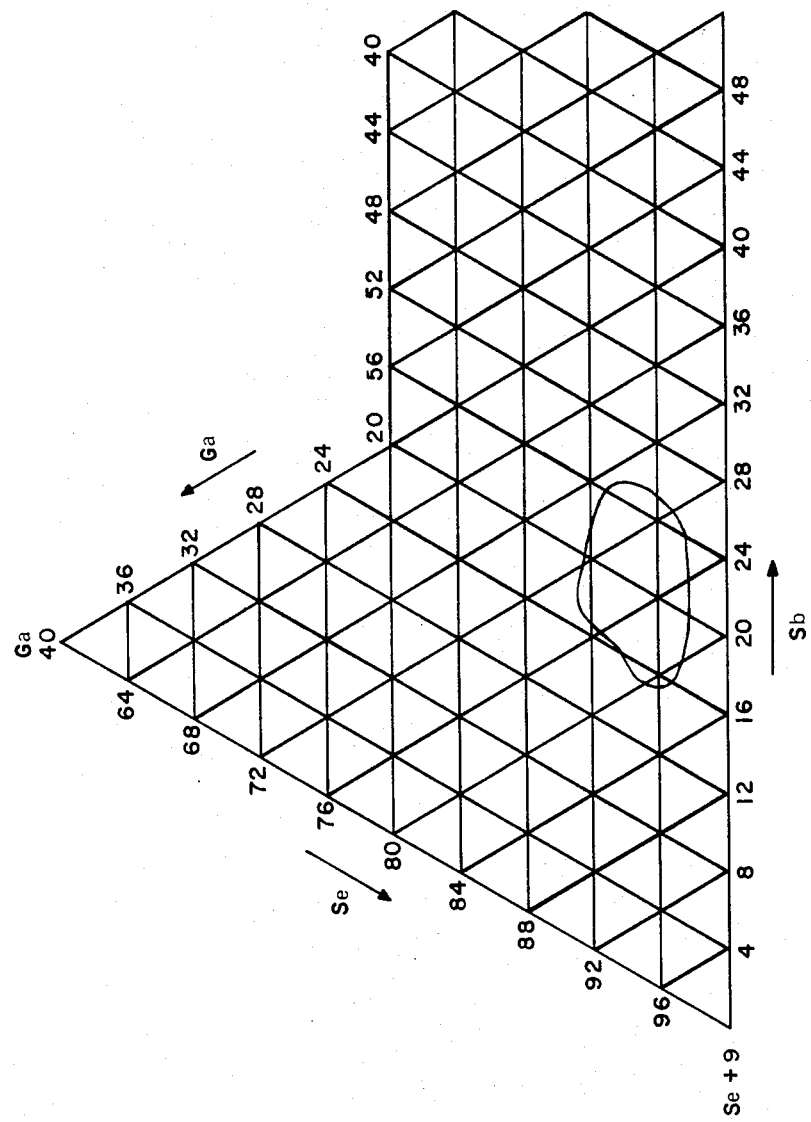
Figure 15:
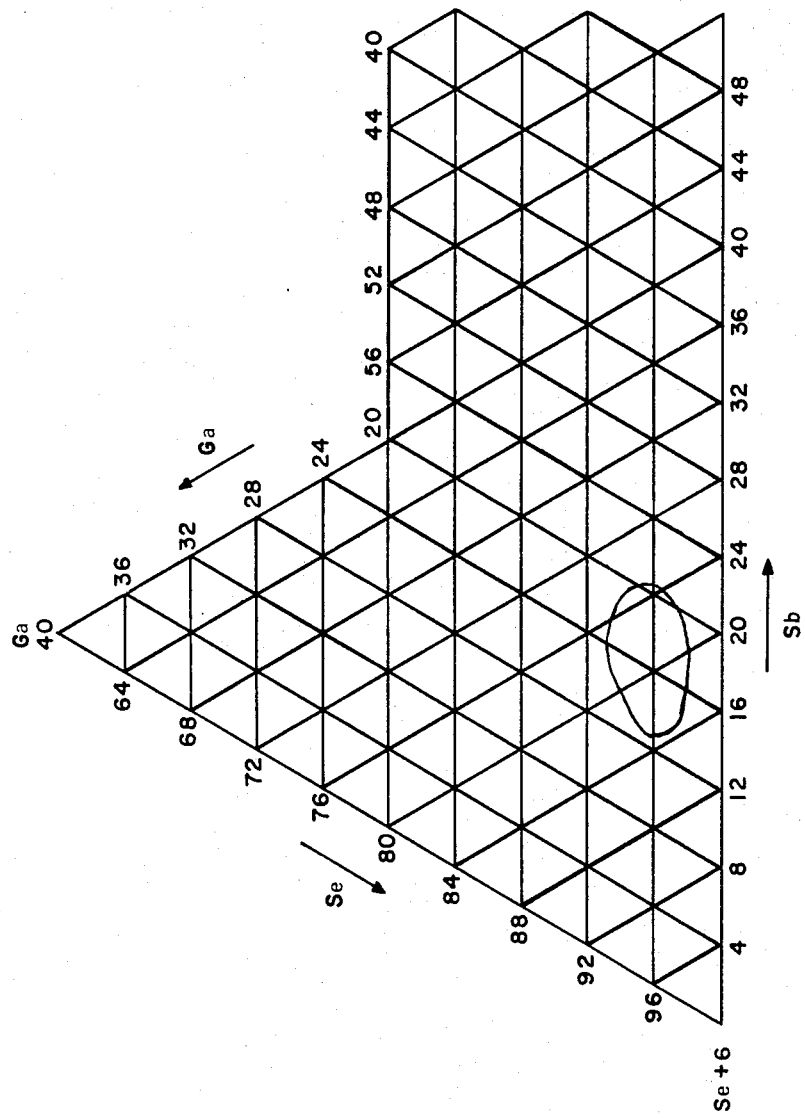
Figure 16:
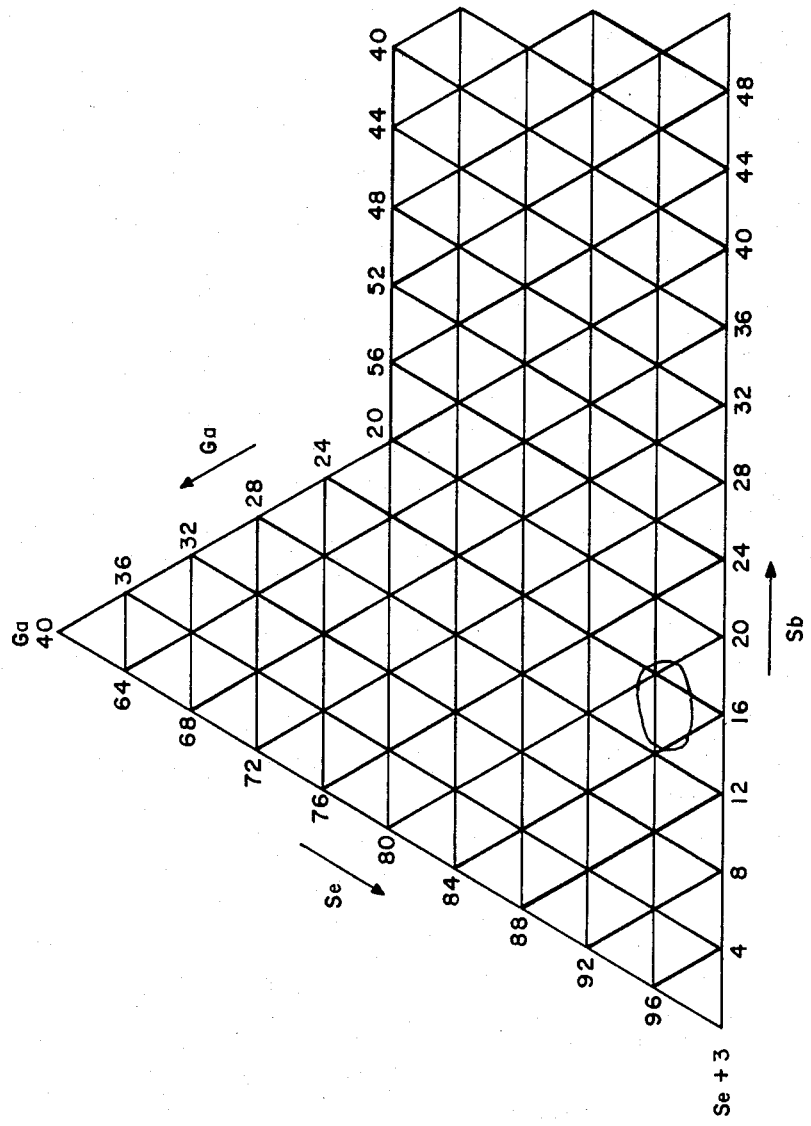
Figure 17:
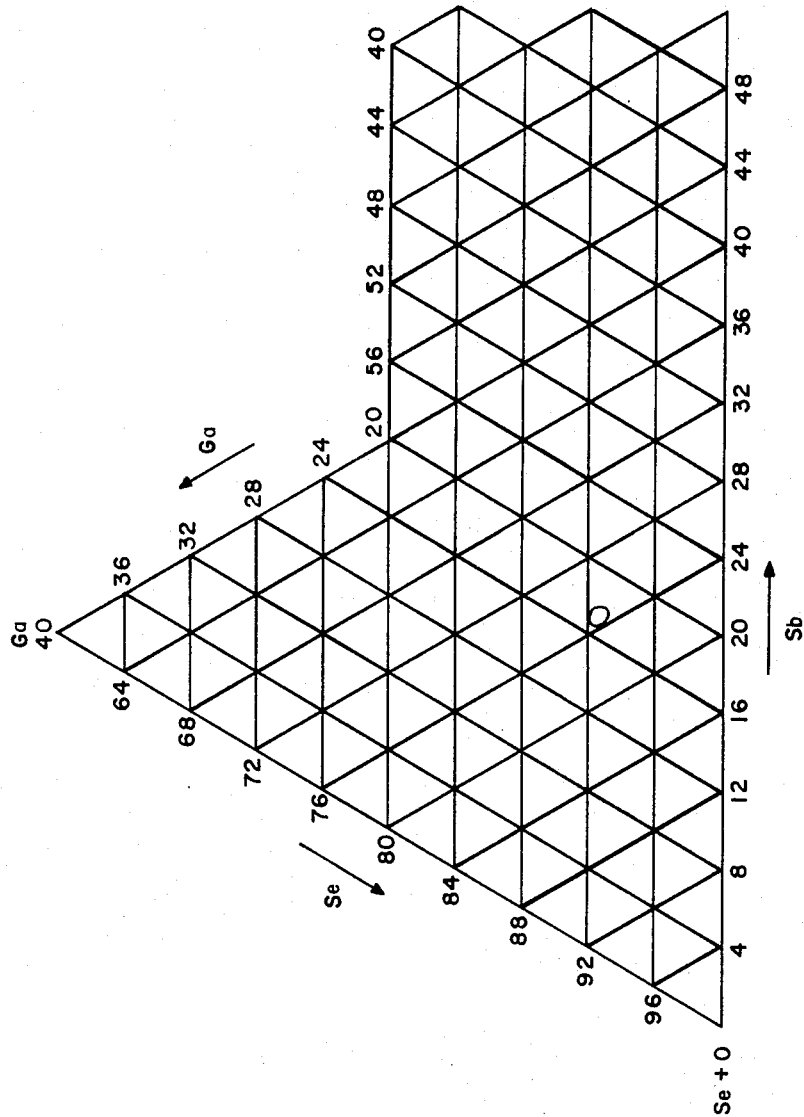

A first set of preferred embodiments of the invention uses compositions of gallium, antimony, selenium, and bromine, where the bromine is between 3% and 30% of the composition. (Atomic percentages are used throughout this application.) Compositions within the range of the present invention particularly include those which promote glass formation, as shown in FIGS. 1 through 17. That is, if the bromine fraction is greater than 18%, the present invention teaches compositions including between 35% and 70% selenium, between 3% and 22% gallium, and between 4% and 30% antimony, within the glass-forming range of composition. Such compositions are shown in FIG. 10. Where the bromine fraction is between 15% and 21%, the present invention teaches a gallium concentration between 3% and 18%, a selenium concentration between 40% and 70%, and an antimony concentration between 7% and 30% within the range which will form a glassy compound. Where the bromine concentration is between 12% and 18%, the present invention teaches compositions in the range of 4% to 17% gallium, 43% to 69% selenium, and 10% to 32% antimony, within the range which forms a glassy composition. Where the bromine concentration is between 9% and 15%, the present invention teaches a gallium concentration in the range of 2% to 14%, a selenium concentration in the range of 45% to 71%, and an antimony concentration in the range of 11% to 34%, within the range of mixtures which forms a glassy compound. Where the bromine concentration is between 6% and 12%, the present invention teaches compositions in the range of 2% to 9% gallium, 60% to 72% selenium, and 13% to 26% antimony. Compositions with 6% or less bromine do not have as good optical properties, and are therefore not within the range of the most preferred embodiments of the present invention. Where the bromine concentration is 6-30%, selenium is in a quantity such that the total concentration of bromine plus selenium comprises between 55% and 90% of the total, gallium is from 2-22%, and antimony is from 4-30% within the range which will form a glass.

The outlined areas on each of the ternary composition diagrams of FIGS. 10-15 show the glass-forming range of compositions in various embodiments of the present invention in bromine-containing systems. As is well known in the art, such ternary composition diagrams are interpreted as follows. The lines parallel to the triangle side opposite the "Ga" vertex are lines of equal gallium concentration. To find the unique composition indicated by a particular point (e.g. the point marked "x" in FIG. 9), the (horizontal) lines of equal Ga concentration are followed over to the Ga axis, where the Ga concentration of point "x" is read off. The Se and Sb concentrations are similarly interpreted.

Note that in FIGS. 1-17, the Se axis is used to show the total percentage of Se plus halogen. For example, in FIG. 1, a value of "80" on the Se axis indicates a total concentration, for selenium and iodine, of 80%. Since the iodine fraction is 20% in FIG. 1, the value of "80" on the Se axis thus corresponds to compositions which contain 60% Se. Note that an additional small area is drawn within the glassy range in FIG. 10: this smaller area represents the single most preferred embodiment of the present invention. The composition of this most preferred embodiment is in the neighborhood of 21%, 14% gallium, 41% selenium, and 24% antimony.

Higher percentages of bromine can be used in practicing the present invention. However, higher fractions of bromine degrade the mechanical properties of the structure and are therefore less preferred.

The present invention is also applicable to a broad range of compositions containing iodine, as shown in FIGS. 1-8. The iodine-containing compositions do not have quite as good mechanical properties as the bromine-containing compositions generally, but are also within the scope of the present invention.

Figure 1:
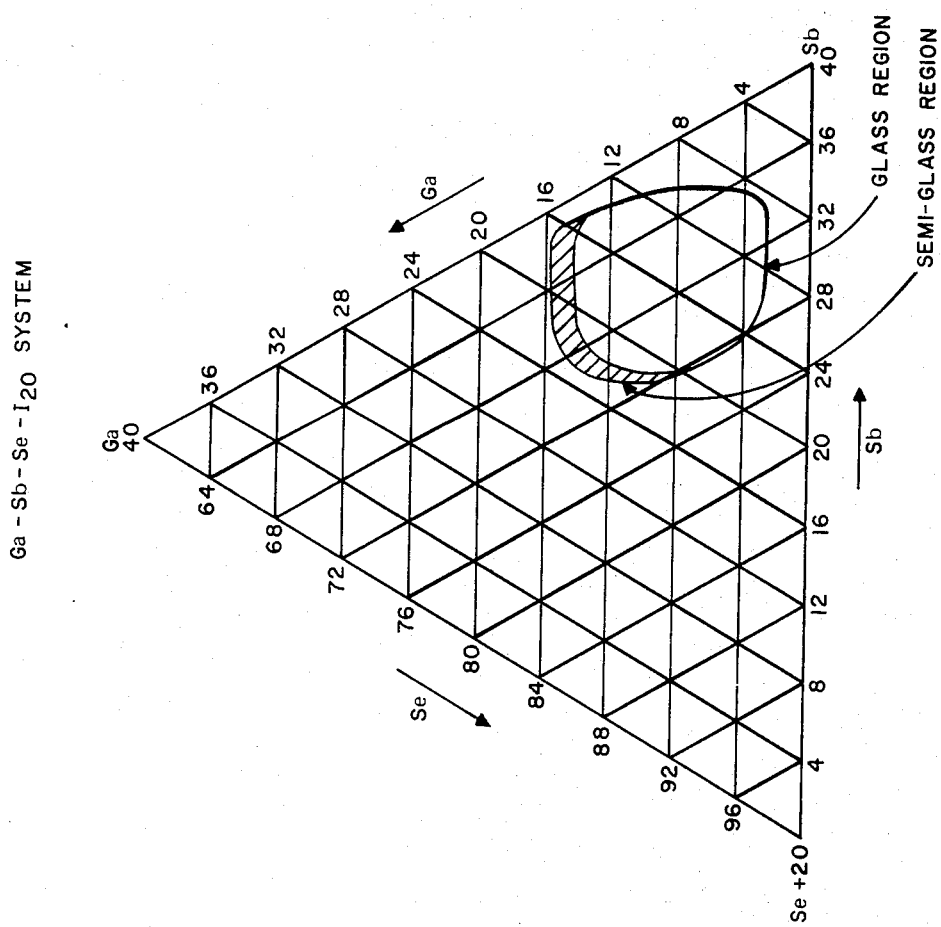
FIGS. 1-6 indicate compositions of gallium, antimony, selenium, and iodine which are useful embodiments of the present invention.
Figure 2:
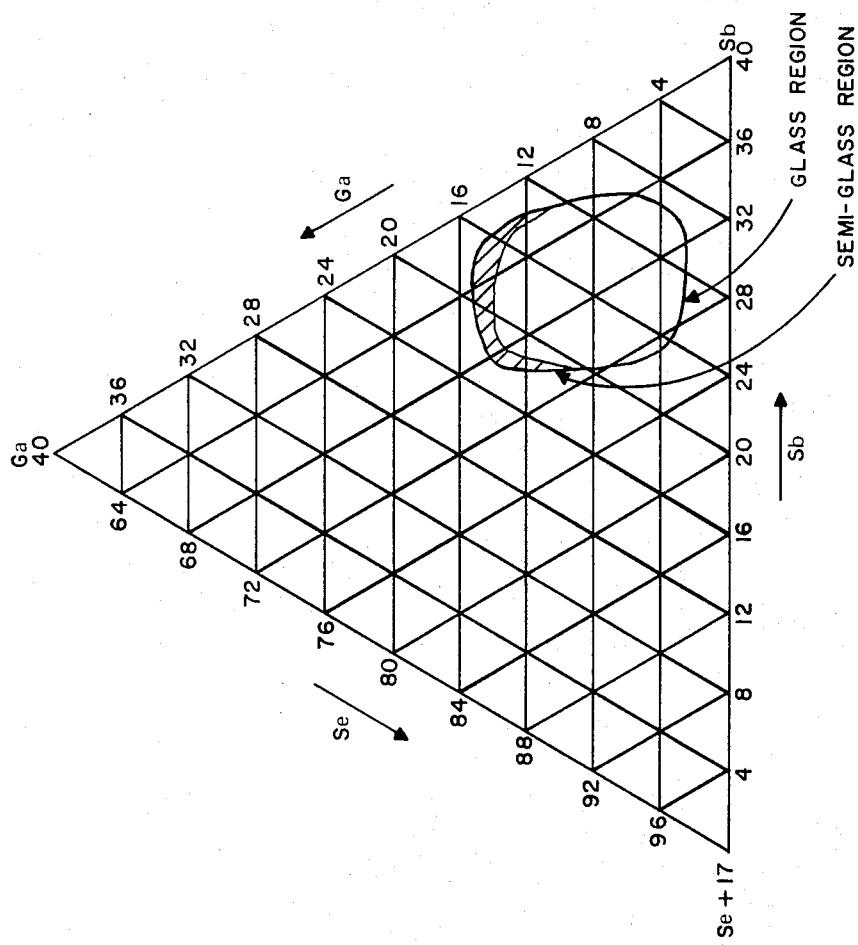
Figure 3:
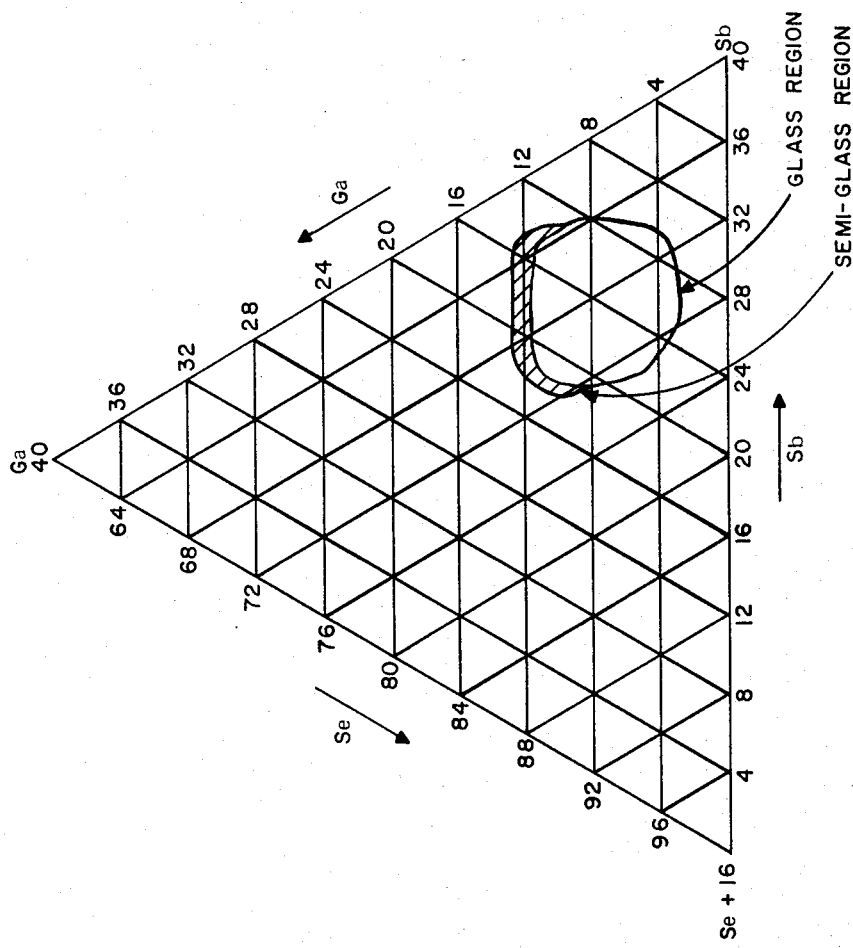
Figure 4:
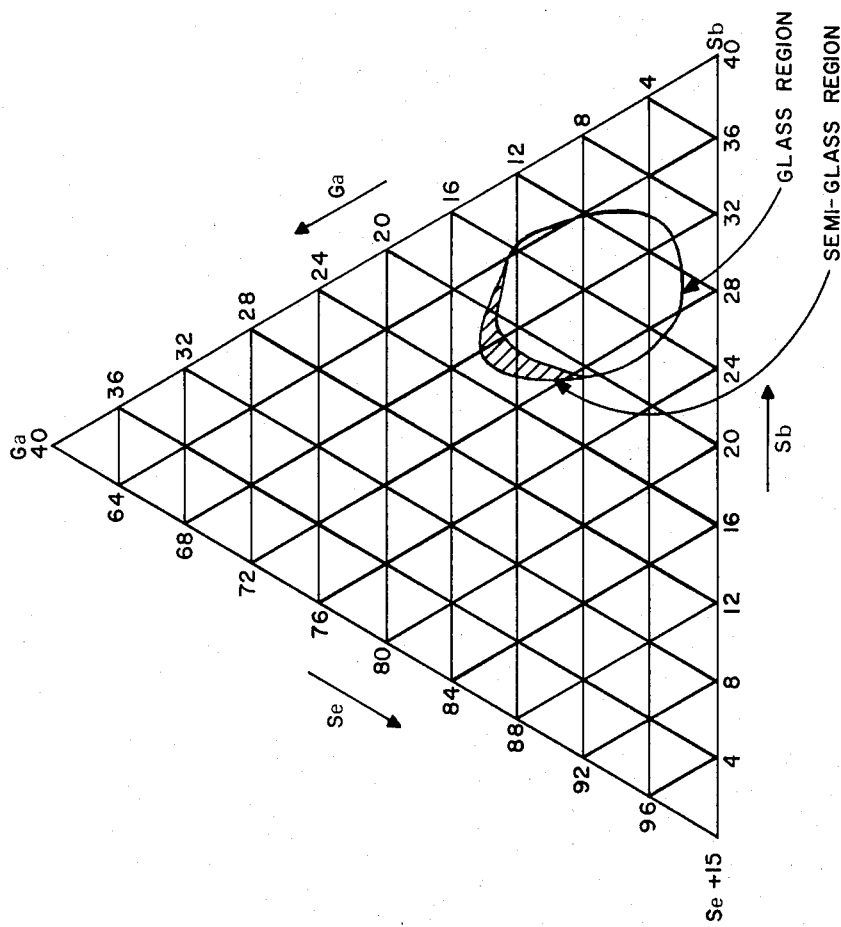
Figure 5:
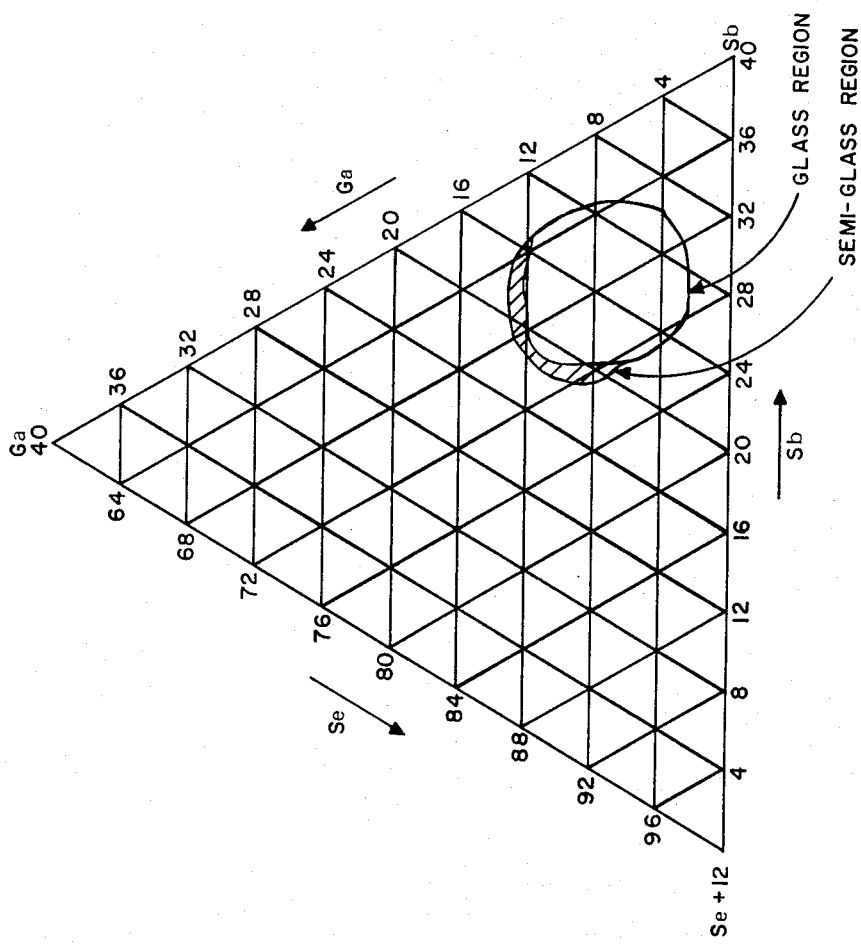
Figure 6:
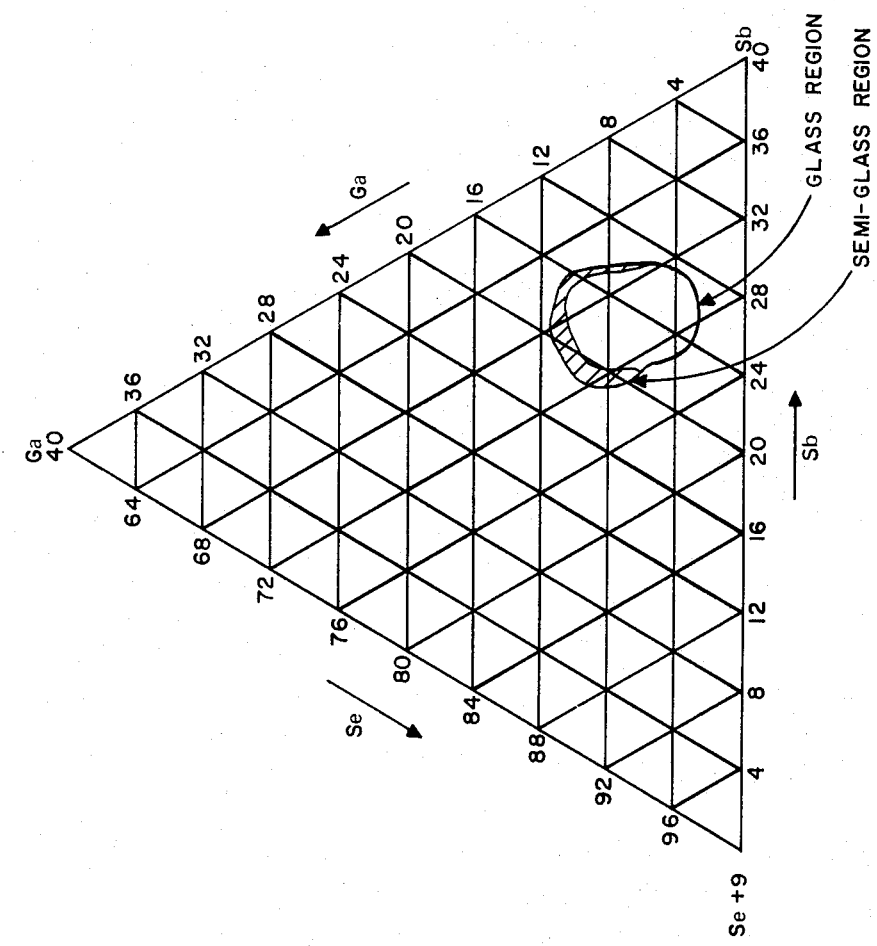
Figure 7:
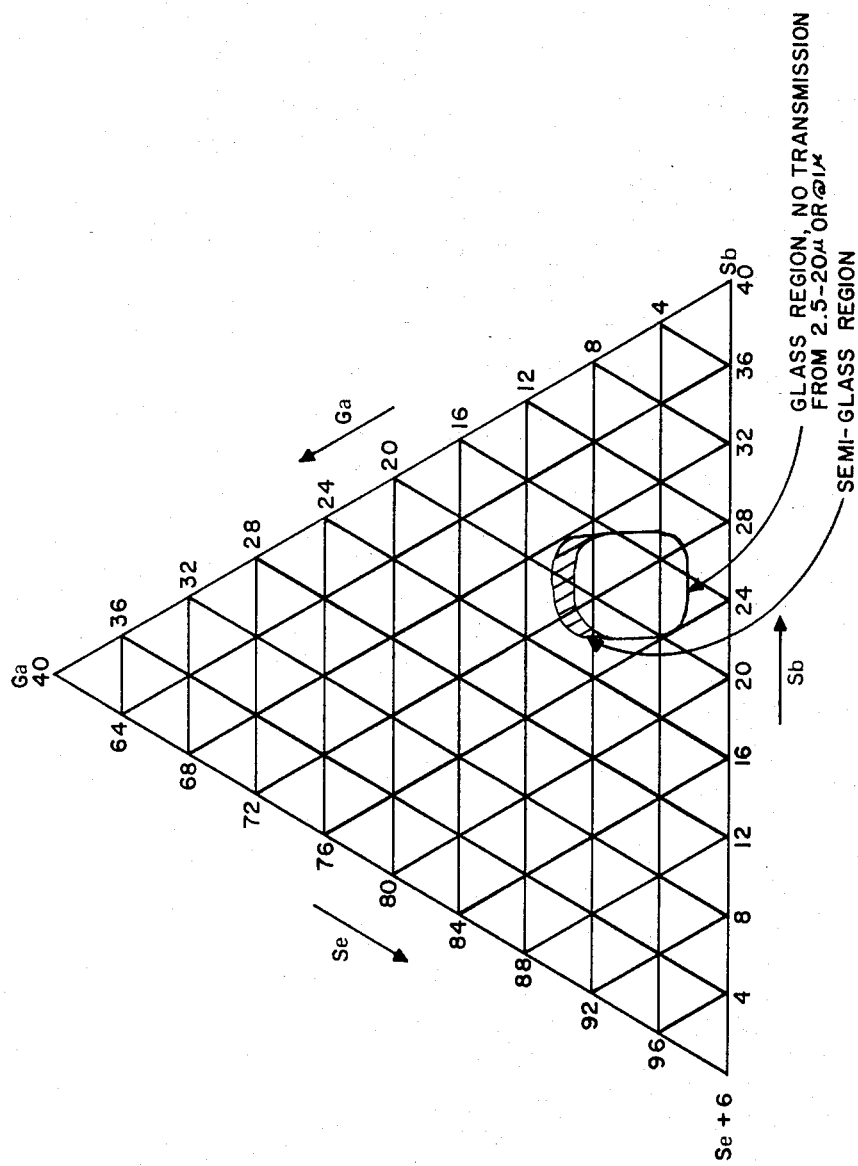
FIGS. 7-9 show additional compositions of gallium, antimony, selenium, and iodine, which do not contain enough iodine to have useful infrared transmission.
Figure 8:
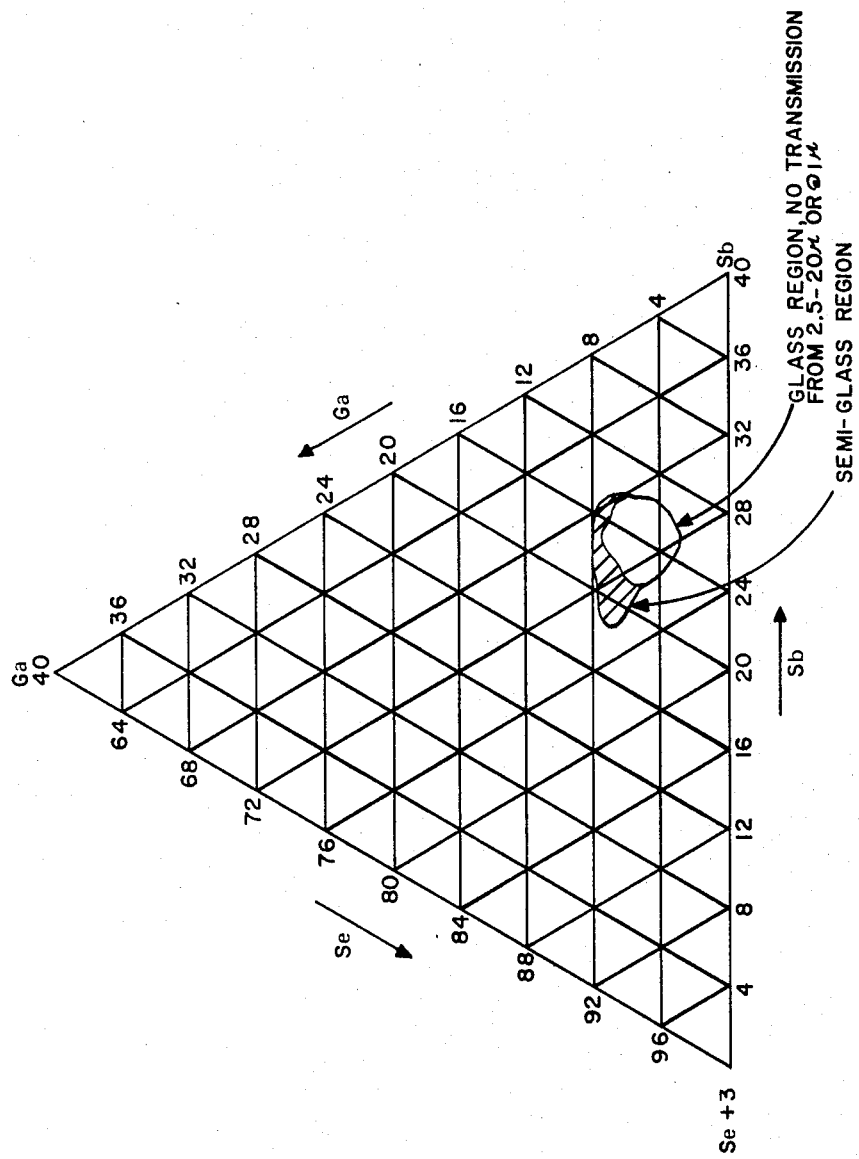

Thus, glassy compositions having more than 16% iodine, 2-16% gallium, 41-53% selenium, and 18-32% antimony, are within the scope of the present invention. Also included within the present invention are glassy compositions containing from 16-20% iodine, 2-14% gallium, 45-56% selenium, and 18-31% antimony. Also included within the scope of the present invention are compositions containing from 15-17% iodine, 2-12% gallium, 47-57% selenium, and 18-30% antimony. Also included within the scope of the present invention are compositions containing from 12-16% iodine, 2-15% gallium, 45-60% selenium, and 18-30% antimony. Also included within the present invention are compositions containing from 2-13% gallium, 50-63% selenium, 9-15% iodine, and 18-32% antimony. Also included within the scope of the present invention are compositions containing from 6-12% iodine, 2-12% gallium, 55-65% selenium, and 18-29% antimony. Also included within the scope of the present invention are compositions containing from 6-25% iodine, selenium is in a quantity such that the total fraction of selenium plus iodine is from 56-80% from 16-32% antimony, and gallium is from 2-16% within the range which will form a glass. Glassy compositions containing lesser amounts of iodine, as shown in FIGS. 7-9, are also included within the scope of the present invention, but are less preferred due to their inferior optical transmission properties.

In addition to the compositions discussed above, other similar chalcogenide glass compositions within the scope of the present invention are defined by wholly or partially substituting, for one or more of the elements discussed above, another element from the same column of the periodic table. Thus, for example, aluminum, indium, or thallium can be substituted for gallium, arsenic or bismuth can be substituted for antimony, sulfur or tellurium can be substituted for selenium, chlorine can be substituted for bromine, or combinations of the foregoing substitutions can be made. That is, any glassy compound containing indium, antimony, selenium, and bromine, or any glassy compound containing indium, arsenic, selenium, and bromine, or other analogous quaternary compounds, are within the present invention.

However, not all of these substitutions are equally desirable. In particular, substitution of indium or thallium tends to lower the softening point of the resulting glass, and is therefore not particularly desirable. Large percentages of aluminum tend to reduce the transmission of the resulting glass, and are therefore similarly not preferred. Bismuth also tends to impair mechanical properties, particularly the softening temperature. Tellurium also substantially impairs mechanical properties. Sulfur tends to cause difficulties due to its high vapor pressure over a melt, and also impairs the long-wavelength-transmissivity and the low-dispersion properties desired.

However, in addition to the foregoing less-preferred substitution, the following substitutions provide significant advantages. First, substitution of arsenic for antimony provides compositions with improved mechanical properties. Arsenic is not included in the most preferred embodiment, due to the various substantial safety hazards caused by processing of arsenic glasses, but in every other respect arsenic is highly desirable. It should be noted that the gallium-arsenic-selenium-bromine glass of this substitution contains only constituents selected from one row of the periodic table. The resulting glass composition is stronger, since the average bonding lengths of the different constituents are more nearly uniform. That is, substitution of a single higher-atomic-number equivalent for one element of the most preferred quaternary glass composition not only leads to the generally weaker bonding expected with higher atomic number, but also tends to add to the lattice strain of the glass. When arsenic is used in compounds according to the present invention, preferably arsenic is used in a slightly less than 1-4-1 substitution for antimony. Thus, for example, one set of preferred arsenic-containing compositions includes compositions in the neighborhood of 14% gallium, 15% to 20% arsenic, 21% bromine, and the remainder selenium. Other specific arsenic-containing compositions are indicated by substituting arsenic for antimony in any of the compositional ranges indicated above.

A second important substitution is phosphorus. Phosphorus can be substituted for antimony in any of the range of compositions indicated above. However, phosphorus, like arsenic, also forms a high vapor pressure over the melt. Although phosphorus is not as poisonous as arsenic, it is extremely reactive, and even more volatile. Thus, phosphorus-containing compositions are useful but are not preferred.

A third very important substitution is use of chlorine as the halogen, to raise the softening temperature and improve the transmission characteristics. Chlorine is expected to have slightly higher vapor pressure over the melt than does bromine. However, the significantly higher volatility of the pure element is somewhat offset by the greater reactivity of chlorine with respect to the other melt constituents. Where chlorine-containing compositions are used, such as gallium-antimony-selenium-chlorine or gallium-arsenic-selenium-chlorine, the fraction of the group V element is preferably decreased somewhat, for equal halogen composition levels when chlorine is used rather than bromine. That is, where 15% chlorine is used, a range of preferred embodiments includes 15% chlorine, 10% to 20% gallium, 50% to 75% selenium, and the balance antimony, arsenic, or mixtures thereof. Other chlorine-containing compositions may be obtained by varying the percentages within this composition, or by directly substituting chlorine for bromine in any of the other compositions given above.

The preferred way of actually fabricating glasses having compositions according to the present invention is to seal the correct composition of ingredients in a quartz ampoule, heat them all up to a high temperature (e.g. 700°–750° C.) and stir the ampoule, e.g. by rocking, for long enough to mix the ingredients, e.g. two hours. After all ingredients have been mixed and liquified, the mixture is cooled rapidly, so that the mixture produced is vitreous. In the presently preferred embodiment, this is done by quenching the quartz ampoule in a high flow rate of inert gas, and then letting it air cool.

The compounding process presently is practiced in batches of about a half kilogram, but large batches may of course be used. As presently preferred, the melt is cooled, after it has been homogenized by rocking at 700° C., down to about 500° C. The purpose of this initial cooling step is to permit the bromine to be redissolved into the melt. That is, a high vapor pressure of bromine will normally exist above the melt at 700° C., and much of this bromine may be dissolved as the melt is cooled down to 500° C. The crucial temperature range for quenching is the range between 500° and 200° C. Rapid cooling of this range is desirable, because slow cooling may lead to the formation of crystalline areas within the glassy matrix. Such crystalline areas lead to degraded optical properties and are therefore undesirable. For example, where a one half kilogram melt is used, the melt is preferably cooled from 500° C. down to about 150° C. in fifteen to twenty minutes. (It should also be noted that the melt is rocked continuously while being cooled from 700° down to 500°, but need not necessarily be rocked while cooling from 500° down to below 200° C.

The third stage of cooling is cooling down through the strain point to room temperature. That is, in any glass, there is a so called strain point, i.e. the temperature at which existing strain becomes frozen in. For the preferred glass composition of the present invention, this strain point is in the neighborhood of 140° C. Thus, a fairly slow anneal is preferably used between a strain point and room temperature, e.g. four hours from 150° C. down to 25° C. If overly rapid cooling is applied in this temperature zone, the end product is likely to be granules or even powder. With some infrared glasses, a subsequent recasting step is used to form optical shapes, after the initial compounding step. However, this is not preferred with the present invention, due to the fraction of volatiles. That is, heating to above 300° C. for recasting is likely to cause significant loss of bromine and degraded mechanical and optical characteristics. Preferably, suitable optical component shapes are manufactured by cold processes, such as grinding, after the optical glass has initially been cast. Due to the volatile halogens used in the preferred compositions, a significant vapor pressure over the melt will result at the highest temperature. That is, where iodine-containing compositions are used, the quartz ampoule should be strong enough to withstand a pressure at elevated temperatures in the neighborhood of twenty atmospheres. Where bromine-containing compositions are used, a maximum pressure at melt temperature in the neighborhood of thirty atmospheres must be allowed for, and where chlorine-containing compositions are used, a maximum pressure at elevated temperature of at least forty atmospheres must be withstood. It should also be noted that the initial heating of the compound mixture should not be performed too rapidly. That is, the initial heating of the melt to 700° C. should preferably be performed over a duration of at least four hours from room temperature. This is important because an exothermic reaction occurs in the neighborhood of 100°, so that if very rapid initial heating is performed, the pressure will skyrocket.

Where one of the elements of the compound is volatile, as with the bromine or chlorine, the correct fraction of volatile element is transported into the ampoule as a compound. For example, where bromine and antimony are both used in the compound, the bromine fraction is provided in the form of antimony tribromide. Similarly, chlorine could be sealed into the ampoule in the form of a chloride.

The present invention is believed to be the first to teach any use of bromine or chlorine in a chalcogenide infrared glass. The present invention is also believed to be the first to teach a combination of both a group III element and a group VII element in a chalcogenide glass. The group VII element is included to give the desired low dispersion at infrared wavelengths, and the group III element compensates for the strong devitrefication tendencies of the group VII element. As is known in the art, the inclusion of a group V element helps the physical strength of the compound produced.

Thus, the present invention provides the crucial advantage of a low-dispersion high-physical-strength infrared glass.

The present invention provides the further advantage of a low-cost high transmissivity low-dispersion infrared glass.

The present invention provides the further advantage of a low-cost low-dispersion high-transmissivity infrared glass for wavelengths longer than eight microns.

The present invention provides the further advantage of a low-cost low-dispersion high-transmissivity high-mechanical-strength glass for wavelengths longer than eight microns.

The present invention provides the further advantage of a low-dispersion glass having good mechanical properties which does not require dangerous processing conditions.

What is claimed is:

1. A glass consisting of:
from 6-30% atomic of bromine;
selenium in a quantity such that the total concentration of bromine plus selenium comprises between 55% and 90% atomic of the total;
from 2-22% atomic of gallium; and
from 4-30% atomic of antimony.

2. A glass consisting of:
from 6-25% atomic of iodine;
a quantity of selenium such that the total atomic fraction of selenium plus iodine is from 56-80%;
from 16-32% atomic of antimony; and
from 2-16% atomic of gallium.

3. A glass composition consisting essentially of:
about 18-30% atomic weight of bromine;
about 35-70% atomic weight of selenium;
about 4-30% atomic weight of antimony or phosphorus; and
about 3-22% atomic weight of gallium.

4. A glass consisting essentially of: about 6-17% atomic weight of iodine;
about 41-65% atomic weight of selenium;
about 18-32% atomic weight of antimony or phosphorus; and
about 2-16% atomic weight of gallium.

5. A glass consisting of:
about 15% atomic weight of chlorine;
about 50-75% atomic weight of selenium;
about 10-20% atomic weight of gallium;
the balance % atomic weight of antimony or phosphorous.

6. A glass consisting of:
about 14% atomic weight of gallium;
about 25% atomic weight of antimony or phosphorous;
about 40% atomic weight of selenium, and
about 21% atomic weight of bromine.

7. A glass consisting of:
about 21% atomic weight of bromine;
about 15-20% atomic weight of arsenic;
about 14% atomic weight of gallium; and
balance % atomic weight of selenium.

* * * * *